United States Patent [19]

Kugelman

[11] Patent Number: 4,713,719
[45] Date of Patent: Dec. 15, 1987

[54] FAST ACTING OVERCURRENT PROTECTOR AND METHOD

[75] Inventor: Michael M. Kugelman, Akron, Ohio

[73] Assignee: The B. F. Goodrich Company, Akron, Ohio

[21] Appl. No.: 826,960

[22] Filed: Feb. 7, 1986

[51] Int. Cl.⁴ ............................................. H02H 9/02
[52] U.S. Cl. ................................... 361/54; 307/636; 361/100; 361/111
[58] Field of Search .................. 361/54, 57, 93, 100, 361/101, 111; 307/252 F; 323/223, 266

[56] References Cited

U.S. PATENT DOCUMENTS

| | | | |
|---|---|---|---|
| 3,303,388 | 2/1967 | Means | 317/33 |
| 3,603,843 | 9/1971 | Clements | 317/33 |
| 3,644,918 | 2/1972 | Perlman | 307/252 F |
| 3,654,518 | 4/1972 | Phelps et al. | 361/101 |
| 3,792,289 | 7/1972 | Kazem | 361/100 X |
| 3,924,159 | 12/1975 | Hoover | 317/33 |
| 4,090,227 | 5/1978 | Schweitzer | 361/57 |
| 4,135,223 | 1/1979 | Holmes | 361/56 |
| 4,138,708 | 2/1979 | Takeshima | 307/252 F X |
| 4,204,148 | 5/1980 | Gaertner | 323/22 |
| 4,209,738 | 6/1980 | Nover et al. | 307/252 F X |
| 4,336,563 | 6/1982 | Suzuki | 361/93 |
| 4,363,064 | 12/1982 | Billings et al. | 361/100 X |

*Primary Examiner*—A. D. Pellinen
*Assistant Examiner*—Jeffrey A. Gaffin
*Attorney, Agent, or Firm*—Woodrow W. Ban

[57] ABSTRACT

An overcurrent protection circuit wherein excessive current flow to current handling components triggers a programmable unijunction transistor which activates a crow-bar device to clamp off current flow through the current handling components. The overcurrent protection circuit finds utility in protecting solid state circuits from overcurrent situations, and is characterized by rapid response time on an order of less than one microsecond.

8 Claims, 1 Drawing Figure

FAST ACTING OVERCURRENT PROTECTOR AND METHOD

FIELD OF THE INVENTION

This invention relates to electronic circuitry and more particularly to means for protecting such circuitry against damage due to overcurrent. Specifically, this invention deals with solid state overcurrent protector means and methods for detecting and averting an overcurrent situation generally within one microsecond or less.

BACKGROUND OF THE INVENTION

Protection of electrical components against overcurrent conditions is well known. Typical traditional approaches include the use of fuses or circuit breakers that detect an excessive flow of electrical current and either self destruct or mechanically open to disconnect the source of electrical current from consuming or conducting devices that may be detrimentally affected by the overcurrent.

Such traditional breakers are typically insufficiently rapid in reaction and often times are possessed of a tripping current capacity too great to provide protection from potentially damaging lower current flows, when considered as candidates for providing protection to sophisticated electronic circuits having overcurrent susceptible solid state components. More recently, response times in the microseconds, and preferably in less than a microsecond, are desirable in protecting particularly sensitive solid state circuitry devices. Traditional mechanical or quasi mechanical systems simply cannot respond with the desired rapidity.

Additionally, modern solid state circuits often require relatively low electrical currents for operation and in any event do not tolerate substantial current excesses even briefly without damage. Traditional mechanical circuit breakers and fuses frequently are possessed of a value for the current required to trip such traditional devices substantially in excess of the current that can be tolerated reasonably by the solid state circuitry being protected. Accordingly, an overcurrent protection means and method for triggering overprotection in an electronic solid state circuit within a time desirably short and/or at a desirably low trip current could find substantial commercial application.

Particularly, a system that examines electrical current flowing through a circuit at a point before the current encounters the current sensitive electronic components being protected, that is a sourcing system for control as distinguished from a sinking system for control wherein the examination of current occurs after the current flows through the load or on the ground side of load, could find substantial utility.

Various other sourcing system means have been suggested in the art for detecting and responding to an overcurrent or overvoltage in solid state circuitry. Examples of such proposals appear to be found in U.S. Pat. Nos. 3,303,388; 3,603,843; 4,336,563; 4,204,148; 4,135,223; and 3,924,159. But these proposals appear to be susceptible to variations in control or system overcurrent protection as a result of drift associated with the operating components as a function of temperature, total current and the like. None appear to show or suggest a self programming current flow protector inherently uniform irrespective of temperature or current flow through the solid state circuitry.

SUMMARY OF THE INVENTION

The present invention provides a method and apparatus for providing overcurrent protection generally within less than a microsecond for a solid state circuit that includes a current conductor associated with a corresponding EMF, or source of voltage, configured to flow current to a load. A sensing means and a crow-bar means are provided in the apparatus, with the sensing means being configured for triggering the crow-bar means.

The sensing means includes a programmable unijunction transistor (PUT) having anode, cathode and gate electrodes. The sensing means also includes a primary resistor positioned in the current conductor of a size and configuration to produce a predetermined voltage drop across the primary resistor when current flowing therethrough exceeds a desired value. The sensing means includes a programming means for providing to the anode electrode of the PUT a voltage value at which it is desired the PUT activate. Likewise, the sensing means includes a means whereby the gate electrode of the PUT can detect a voltage in the current conductor in a position following passage of the electrical current through the primary resistor.

The crow-bar device includes sensing and current handling electrodes with the sensing electrode of the crow-bar device being joined to the cathode electrode of the PUT. In preferred embodiments, a signal differentiating means such as an R-C circuit effects this joinder; the R-C circuit is also joined through electrical resistance to a point of low reference voltage in the solid state circuit.

One of the current conducting electrodes of the crow-bar device is joined to control electrodes associated with current consuming or controlling devices contained in the solid state circuit while the other current conducting electrode of the crow-bar current device is connected to a voltage in the solid state circuit, typically the low reference voltage.

In operation, current flowing through the current conductor and thereby through the primary resistor imposes a primary voltage drop across the primary resistor proportional to the electrical current flowing through the current conductor. A pair of resistors is connected between the current conductor at a point prior to passage of the flowing electrical current through the primary resistor and the low voltage reference. The anode electrode of the PUT is joined between the resistors of this pair and the pair thereby programs a voltage at which it is desired the PUT operate, or so-called fire. The voltage in the electrical current conductor after passage of the electrical current through the primary resistor is sensed and this sensed voltage is provided to the gate electrode of the PUT.

Where the gate voltage at the PUT is less by an amount inherent to the PUT than the programmed voltage at the anode electrode of the PUT, the PUT fires via the cathode electrode of the PUT through the R-C circuit to establish a voltage at the sensing electrode of the crow-bar device. Upon application of a voltage to the sensing electrode of the crow-bar device, the crow-bar device becomes conductive and can be configured either to apply an electrical signal to control electrodes of electrical current sensitive devices through which such current flows or to remove an electrical signal from control electrodes of current sensitive components of the solid state circuit through which the current flows with the objective to effectively clamp off current flow through such components or devices.

Preferably the crow-bar device is a silicon control rectifier (SCR) having anode, cathode and gate electrodes with either the anode or cathode being connected to the control electrodes of current sensitive components and the gate electrode of the SCR being joined to the cathode of the PUT through the R-C circuit. In preferred embodiments, the anode of the SCR is connected to the control electrode of the current consuming components and the cathode of the SCR is connected to a low voltage reference such as electrical ground.

The above and other features and advantages of the invention will become more apparent when considered in light of a description of a preferred embodiment of the invention together with a drawing, both together forming a part of the specification.

BEST EMBODIMENT OF THE INVENTION

Figure 1:
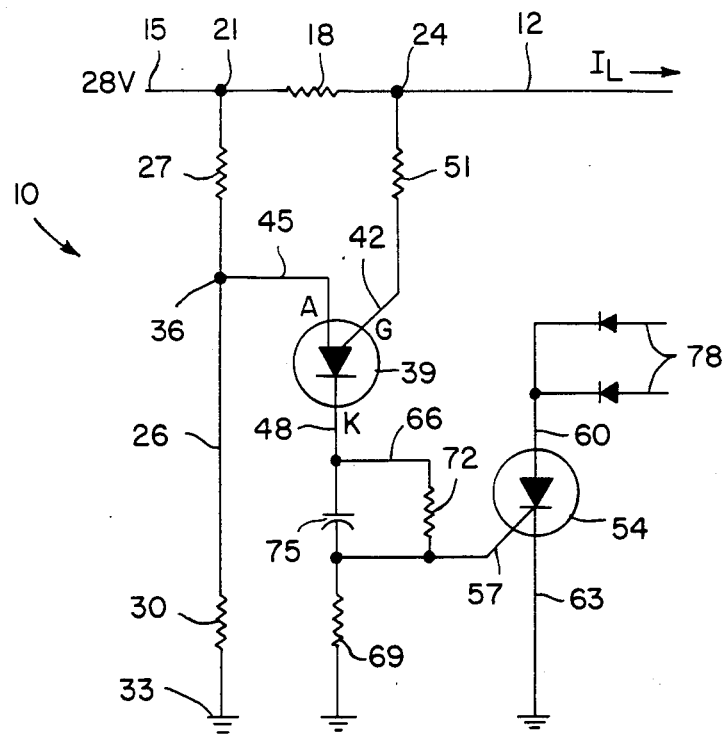
FIG. 1 is an electrical schematic of an embodiment of the invention.

Referring to the drawings, FIG. 1 is an electrical schematic depicting a sourcing system overcurrent protection circuit 10 in accordance with the invention. By sourcing system, what is meant is determination between a point prior to the circuit load and a low voltage reference as distinguished from sinking system which includes determinations between a point subsequent to the load and a low voltage reference.

The overcurrent protection circuit 10 includes a main current conductor 12 configured for conducting electrical current from an EMF 15, that is a source of elecromotive force to components of a solid state circuit configured for functions such as switching the current or consuming the electrical current (not shown). A primary resistor 18 is positioned in the main current conductor 12 and defines a zone of more elevated voltage 21 and a zone of less elevated voltage 24 associated with a voltage drop across the primary resistor 18 resulting from flow of electrical current through the primary resistor 18. Electrical current flow is from the zone of elevated voltage 21 towards the zone of less elevated voltage 24.

The voltage drop engendered across the primary resistor 18 by passage of electrical current is a primary voltage drop and this primary voltage drop is proportional to the flow of electrical current through the main current conductor 12. As electrical current flowing through the main current conductor 12 increases, the primary voltage drop associated with the primary resistor 18 increases.

While the EMF 15 can be of any suitable or conventional nature such as a battery, transformer, or generator, often the EMF 15 is a power supply circuit associated with an electronic device utilizing the overcurrent protector.

A voltage divider 26, that is consisting of a pair of resistors 27, 30, bridges between the zone of elevated voltage 21 and a point of low reference voltage 33. In this best embodiment, the point of low reference voltage 33 is also the ground. The resistors 27, 30 are of a size and configuration to produce at a juction 36 between the resistors 27, 30 a desired voltage relative to the voltage in the zone 21 of elevated voltage.

The overprotection circuit 10 includes a programmable unijunction transistor (PUT) 39 having gate 42, anode 45 and cathode 48 electrodes. The anode electrode 45 is joined to the voltage divider 26 at the junction 36. The PUT 39 gate electrode 42 is joined to the zone of less elevated voltage 24 through a resistor 51.

The gate electrode 42 of the PUT 39 is thereby configured for sensing the voltage in the zone of less elevated voltage 24. Where the voltage sensed by the anode electrode 45 of the PUT 39 is generally greater than the voltage sensed by the gate electrode 42, the PUT will fire through the cathode electrode 48.

A crow-bar device 54 is provided in the overcurrent protection circuit 10. The crow-bar device 54 includes a sensing electrode 57 and current conducting electrodes 60, 63.

A signal differentiating circuit, here an R-C circuit 66 is provided joining the sensing electrode 57, of the crow-bar device 54 with the cathode electrode 48 of the PUT 39. The R-C circuit 66 is tied to the point of low voltage 33, that is the low reference voltage employing a resistor 69.

The crow-bar device 54 can be of any suitable or conventional type configured for altering the state of current flow through the crow-bar device 54 via the conducting electrodes 60, 63 upon the presence of a particular voltage or current at the sensing electrode 57. Typically, the crow-bar device is a silicon control rectifier (SCR), but may, depending upon circuit conditions include triodes, pentodes, field effect transistors (FET), tetrodes, silicon controlled switches, gate controlled switches, thyratrons, unijunction transistors, or the like that may be determined to be of utility in the particular circuit configuration for which the overcurrent protection device 10 is being configured.

The R-C circuit 66 functions to reset the PUT 39. In the R-C circuit 66, a resistor 72 is configured to be of very high resistance, for example, one megohm. A capacitor 75, initially discharged, is charged by the current flowing through the cathode electrode 48 of the put 39. As the capacitor 75 starts charging, the sensing electrode 57 of the crow-bar device 54 senses the electrical pulse resulting from the initiation of charging of the capacitor 75 and functions to activate the crow-bar device 54. At some point during or upon completion of charging of the capacitor 75, current flow through the R-C circuit 66 drops below a level necessary to sustain the PUT 39 in a "on" state, principally because of the elevated resistance of the resistor 72. Consequently the PUT 39 "turns off" or "resets" and the R-C circuit 66 is gradually drained to the point of low voltage 33 employing the resistor 72. The crow-bar device 54 is configured to be joined through the current carrying electrode 60 to control electrodes (not shown) of current switching devices, such as FET transistors and the like, which it is desired be protected from overcurrent. In the configuration of FIG. 1, when the SCR is activated, the electrodes 60, 63 function to drain such control electrodes (not shown) to the point of low voltage 33. Drainage of the control electrodes functions to switch off or "clamp off" devices controlled by such control electrodes.

It should be apparent that the role of the current carrying electrodes 60, 63 can be reversed whereby activation of the crow-bar device 54 applies a current to a control electrode for such purposes as to obtain a current clamping action on a device controlled by the control electrode. The particular selection of a voltage orientation for the current carrying electrode 60, 63 is a function of the nature of the devices being protected.

The crow-bar device 54 is reset in suitable or conventional manner by, typically, creating a condition of low current flow through the current carrying electrode 60, 63. Where a crow-bar device is an SCR, low current flow functions to turn off the crow-bar device 54. It should be apparent that the crow-bar device 54 could also be configured to supply electrical current to control electrodes (not shown) of devices controlled by such control electrodes during normal operation, and by the application of electrical current from the cathode 48 of the PUT 39 to the sensing electrode 57 of the crow-bar device 54, current flow could be terminated through the conducting electrodes 60, 63 to the control electrodes. Operation of devices controlled by such control electrodes could be thereby terminated. Conduits 78 are provided for communicating electrical current and voltage between the current carrying electrode 60 of the crow-bar device 54 and control electrodes (not shown) of any electrical device it is desired be protected employing the device 10 of the invention.

In operation of the overcurrent protecting device 10, an excessive current flow through the main current conductor 12 causes a voltage drop across the primary resistor 18 producing a voltage at the zone of less elevated voltage 24 sufficiently lower than the voltage present at the junction 36 so that the PUT 39 fires into the R-C circuit 66 and thereby triggers the sensing electrode 57 of the crow-bar device 54. The crow-bar device 54 closes to strip current/voltage present at control electrodes of devices for which overcurrent protection is desired controlled by such control electrodes by passing the electrical current through the conducting electrodes 60, 63 to the point of low voltage 33. Flow of electricity through the cathode 48 of the PUT 39 charges the capacitor 75 which terminates significant electrical flow through the PUT 39 and resets the PUT 39. The capacitor 75 is then discharged through the resistor 72. If the crow-bar device 54 is of a latching type, the crow-bar device 54 remains in the conducting mode until reset; otherwise the crow-bar device 54 can revert to an open or non-conducting mode.

The circuit of the instant invention typically functions within less than one microsecond to effect a clamping off of the flow of electrical current through components of the solid state circuit configured for switching and/or consuming electrical current flowing through the circuit. This rapid response time can be of great value in protecting such devices as bipolar or FET transistors.

While a preferred embodiment of the invention has been shown and described in detail, it should be apparent that various modifications may be made thereto without departing from the scope of the claims that follows.

What is claimed is:

1. A sourcing system overcurrent protector configured for action in less than one microsecond in a solid state circuit including a current conduit having a corresponding supply voltage and configured to flow current to a load, comprising: a sensing means and crow-bar means, the sensing means being configured for triggering the crow-bar means; the sensing means including a programmable unijunction transistor (PUT) having anode, gate and cathode electrodes, a primary resistor positioned in the current conductor of a size configured to produce a predetermined voltage drop across the primary resistor when current flowing therethrough exceeds a desired value; a programming means for providing the PUT anode electrode with a voltage value at which it is desired the PUT shall activate; a means whereby the gate of the PUT detects a voltage in a current flow direction downstream of the primary resistor; the crow-bar device having anode, cathode and gate electrodes, the crow-bar device gate electrode and the PUT cathode electrode being joined through signal differentiating circuit the signal differentiating circuit including a capacitor and being configured whereby not later than upon completion of charging of the capacitor, electrical flow through the PUT is terminated, and the signal differentiating circuit being joined through electrical resistance to a point of low reference voltage in the solid state circuit; one of the crow-bar device anode and cathode electrodes being joined to control electrode means for current consuming/switching devices contained in the solid state circuit and the other crow-bar device electrode being connected to a voltage in the solid state circuit.

2. The protector of claim 1, the crow-bar device being a silicon controlled rectifier (SCR), the SCR cathode electrode being connected to the point of low voltage reference.

3. The protector of claim 1, the programming means being a voltage divider including a pair of resistors in series between the current conductor upstream in a direction of current flow from the primary resistor and the point of low voltage reference, the PUT anode electrode being connected between the resistors, and the resistors being of a configuration to produce a desired voltage at the PUT anode electrode at which desired voltage the PUT is to fire.

4. The protector of claim 3, the point of low voltage reference being ground.

5. A method for providing overcurrent protection in less than a microsecond for current consuming/switching components having control electrodes, of a solid state circuit, the circuit including a current conduit supplying electrical current at a particular voltage to the current consuming/switching components, comprising the steps of:
   impressing a primary voltage drop in the current conduit proportional to the electrical current flowing in the current conduit;
   programming a voltage at an anode electrode of a programmable unijunction transistor (PUT) below which it is desired the PUT fire;
   sensing the voltage in the current conduit wherein the primary voltage drop is incurred;
   applying the sensed voltage to a gate electrode of the PUT;
   connecting through a signal differentiating circuit having a capacitor; a cathode electrode of the PUT to a sensing electrode of a crow-bar device;
   connecting one current conducting electrode of the crow-bar device to a reference voltage in the circuit;
   connecting a remaining current conducting electrode of the crow-bar device to a control electrode of the current consuming/switching component whereby detection at the PUT gate electrode of a sensed voltage less than the voltage programmed, fires the PUT which activates the crow-bar device to clamp off electrical current flow at the current consuming component; and charging the capacitor to terminate current flow through the PUT.

6. The method of claim 5, the crow-bar device being a silicon control rectifier (SCR) having anode, cathode and gate electrodes, the anode electrode being joined to the control electrode of the current consuming/switching component, the gate electrode of the SCR being joined to the cathode electrode of the PUT through the signal differentiating current.

7. The method of claim 6 including the step of reducing the primary voltage via a voltage divider to a low voltage reference through at least two resistors in series, joining the PUT anode electrode to the voltage divider between the resistors, and sizing the resistors to produce a programmed voltage at the junction between the voltage divider and the PUT gate electrode.

8. The method of claim 7, the reference and low-voltage reference being ground.

* * * * *